(12) United States Patent
Su

(10) Patent No.: US 10,526,082 B2
(45) Date of Patent: Jan. 7, 2020

(54) TRIAXIAL HELICOPTER

(71) Applicant: Max Su, Tainan (TW)

(72) Inventor: Max Su, Tainan (TW)

(\*) Notice: Subject to any disclaimer, the term of this patent is extended or adjusted under 35 U.S.C. 154(b) by 67 days.

(21) Appl. No.: 15/935,797

(22) Filed: Mar. 26, 2018

(65) Prior Publication Data

US 2018/0304996 A1 Oct. 25, 2018

(30) Foreign Application Priority Data

Apr. 19, 2017 (TW) .............................. 106113011 A

(51) Int. Cl.
| | | |
|---|---|---|
| *B64C 27/26* | (2006.01) | |
| *B64C 15/02* | (2006.01) | |
| *B64C 9/02* | (2006.01) | |
| *B64C 27/08* | (2006.01) | |
| *B64C 29/00* | (2006.01) | |
| *B64C 39/02* | (2006.01) | |
| *B64D 27/20* | (2006.01) | |

(52) U.S. Cl.
CPC ................. *B64C 27/26* (2013.01); *B64C 9/02* (2013.01); *B64C 15/02* (2013.01); *B64C 27/08* (2013.01); *B64C 29/0025* (2013.01); *B64C 39/024* (2013.01); *B64C 2201/024* (2013.01); *B64C 2201/048* (2013.01); *B64C 2201/108* (2013.01); *B64D 27/20* (2013.01)

(58) Field of Classification Search
CPC ......... B64C 15/00; B64C 15/02; B64C 15/14; B64C 27/08; B64C 27/22; B64C 27/26; B64C 2201/024; B64C 2201/027
See application file for complete search history.

(56) References Cited

U.S. PATENT DOCUMENTS 2,651,480 A * 9/1953 Pullin ..................... B64C 27/08
244/17.23
2,711,295 A * 6/1955 Peterson ............... B64C 39/001
244/7 R
(Continued)

FOREIGN PATENT DOCUMENTS

GB 2483881 A * 3/2012 ............. B64C 25/52
KR 1575120 B1 * 12/2015 ........... B64C 39/024
(Continued)

*Primary Examiner* — Joseph W Sanderson
(74) *Attorney, Agent, or Firm* — Che-Yang Chen; Law Offices of Scott Warmuth

(57) ABSTRACT

A triaxial helicopter includes a fuselage and an airframe, and three rotor modules and a driving source are installed to the airframe, and two turbofans are mounted at the tail of the airframe, and the horizontal elevator is installed between the two turbofans and coupled to the driving source through a link rod module, so that when the triaxial helicopter is operated, the two turbofans are operated to produce a backward airflow to assist propelling the triaxial helicopter to move forward, so as to improve the flying speed of the triaxial helicopter. When it is necessary to ascend or descend the triaxial helicopter, the driving source controls the link rod module to adjust the yaw direction of the horizontal elevator according to an ascending or descending requirement, and the airflow produced by the turbofans blows in a direction with the horizontal elevator to increase the lifting force of the triaxial helicopter.

2 Claims, 4 Drawing Sheets

(56) References Cited

U.S. PATENT DOCUMENTS

| | | | | |
|---|---|---|---|---|
| 3,940,092 A * | 2/1976 | Farris | ................ | B64C 15/02 244/12.5 |
| 4,478,378 A * | 10/1984 | Capuani | ................ | B64C 3/50 244/12.5 |
| 6,926,229 B2 * | 8/2005 | Cummings | ................ | B64C 15/02 244/12.5 |
| 7,267,300 B2 * | 9/2007 | Heath | ................ | B64C 15/14 244/12.3 |
| 7,364,115 B2 * | 4/2008 | Parks | ................ | B64C 11/001 244/12.4 |
| 7,857,254 B2 * | 12/2010 | Parks | ................ | B64C 15/00 244/12.4 |
| 8,240,125 B2 * | 8/2012 | Kawai | ................ | B64C 15/02 239/265.17 |
| 9,676,479 B2 * | 6/2017 | Brody | ................ | B64C 29/0033 |
| 9,823,664 B2 * | 11/2017 | Krogh | ................ | G01C 5/005 |
| 10,137,982 B1 * | 11/2018 | Dormiani | ................ | B64C 27/26 |
| 10,272,986 B2 * | 4/2019 | Taylor | ................ | B64C 39/024 |
| 10,287,011 B2 * | 5/2019 | Wolff | ................ | B64C 29/0033 |
| 10,315,759 B2 * | 6/2019 | Nemovi | ................ | B64C 27/82 |
| 2012/0091257 A1 * | 4/2012 | Wolff | ................ | B64C 29/0033 244/12.4 |
| 2016/0194069 A1 * | 7/2016 | Taylor | ................ | B64C 39/024 244/17.23 |
| 2016/0214710 A1 * | 7/2016 | Brody | ................ | B64C 29/0033 |
| 2016/0311528 A1 * | 10/2016 | Nemovi | ................ | B64C 27/82 |
| 2017/0369162 A1 * | 12/2017 | Alzahrani | ................ | B64C 29/0033 |
| 2018/0057163 A1 * | 3/2018 | Sababha | ................ | B64C 39/024 |
| 2018/0244377 A1 * | 8/2018 | Chan | ................ | B64C 27/605 |

FOREIGN PATENT DOCUMENTS

| | | | | |
|---|---|---|---|---|
| KR | 1642396 B1 * | 7/2016 | ............ | B64C 27/08 |
| TW | M358789 U | 6/2009 | | |
| TW | 201613800 A | 4/2016 | | |

* cited by examiner

TRIAXIAL HELICOPTER

FIELD OF THE INVENTION

The present invention relates to helicopters, in particular to a triaxial helicopter capable of accelerating air flow propulsion by turbofans.

BACKGROUND OF THE INVENTION

Helicopter is an aircraft that flies by means of the rotation of rotors, ascends and descends vertically, and requires no runway for takeoff and landing. At present, the helicopter is used extensively in various different areas such as tourism, disaster rescue, marine rescue, anti-smuggling, firefighting, commercial transportation, medical assistance, agriculture, natural resources exploration, etc.

When a helicopter flies, the rotors of the helicopter rotate horizontally to achieve the ascending or descending effect. When it is necessary to control the helicopter to move forward, the pitch angle of a helicopter airframe or the rotor is controlled to blow airflow backward in order to propel the helicopter forward. However, it is not easy to control the pitch angle of the helicopter airframe. If the pitch angle is too large, then the helicopter will be affected by wind pressure to produce forward resistance easily, or the helicopter may even lose its balance and crash due to the too-large wind pressure.

To improve the aforementioned drawback, the inventor of the present invention has filed R.O.C. Pat. Application No. 103134614 entitled "Propulsion accelerator of multiaxial helicopter" in 2014, the propulsion accelerator comprises a drive unit and a horizontal propeller installed at the bottom of an airframe, and a throttle control module for controlling the speed of the helicopter, wherein a sensed message is fed back to the drive unit, and the drive unit drives the linked horizontal propulsion to change the included angle, so as to fly the helicopter in a high speed stably.

SUMMARY OF THE INVENTION

In view of the aforementioned drawback of the conventional helicopter that controls the helicopter to propel forward by controlling the pitch angle of the airframe or rotor and may lose its balance due to the wind pressure, it is a primary objective of the present invention to overcome the aforementioned drawbacks by installing a turbofan to the helicopter and using the airflow produced by the operation of the turbofan to propel the helicopter forward.

Another objective of the present invention is to install a horizontal elevator between two turbofans, so that the airflow produced by the turbofans can blow in the yaw direction of the horizontal elevator to increase the lifting force of the helicopter.

To achieve the aforementioned and other objectives, the present invention provides a triaxial helicopter comprising a fuselage and an airframe, and three rotor modules and a driving source being installed to the airframe, characterized in that two turbofans are mounted at the tail of the airframe, and the horizontal elevator is installed between the two turbofans, and the horizontal elevator is coupled to the driving source through a link rod module, and both ends of the horizontal elevator are disposed within a range of the rotation of a fan blade of the turbofan.

In the structure as described above, when the triaxial helicopter is operated, the backward airflow produced by the operation of the two turbofans assists the triaxial helicopter to be propelled forward, and when it is necessary to ascend or descend the triaxial helicopter, the driving source controls the link rod module to adjust the yaw direction of the horizontal elevator according to the ascending or descending conditions, so that the airflow produced by the turbofans blows in a direction with the horizontal elevator to increase the lifting force of the triaxial helicopter.

DESCRIPTION OF THE PREFERRED EMBODIMENTS

The present invention will become clearer in light of the following detailed description of an illustrative embodiment of this invention described in connection with the drawings.

Figure 1:
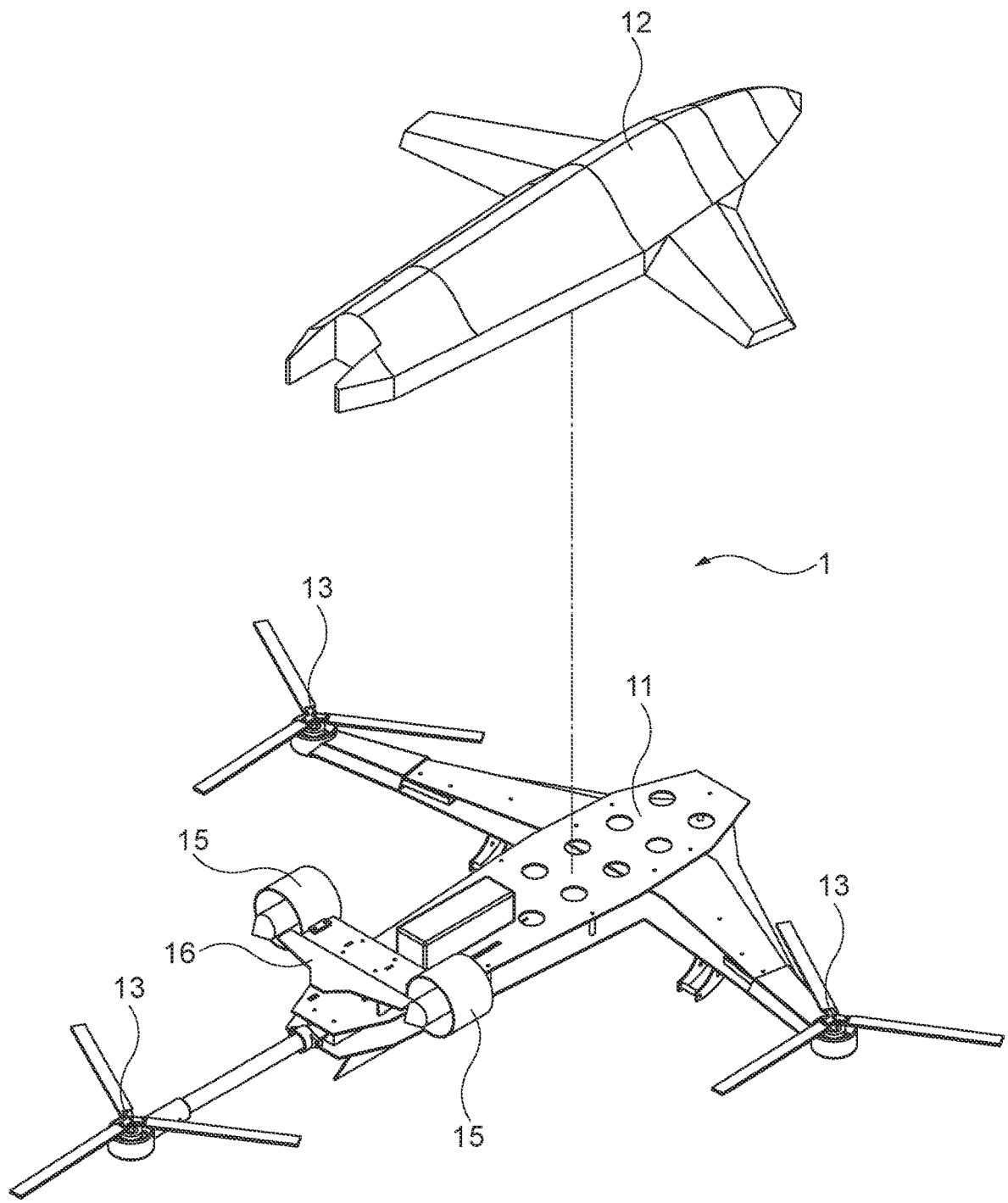
FIG. 1 is an exploded view of a triaxial helicopter of the present invention.
Figure 2:
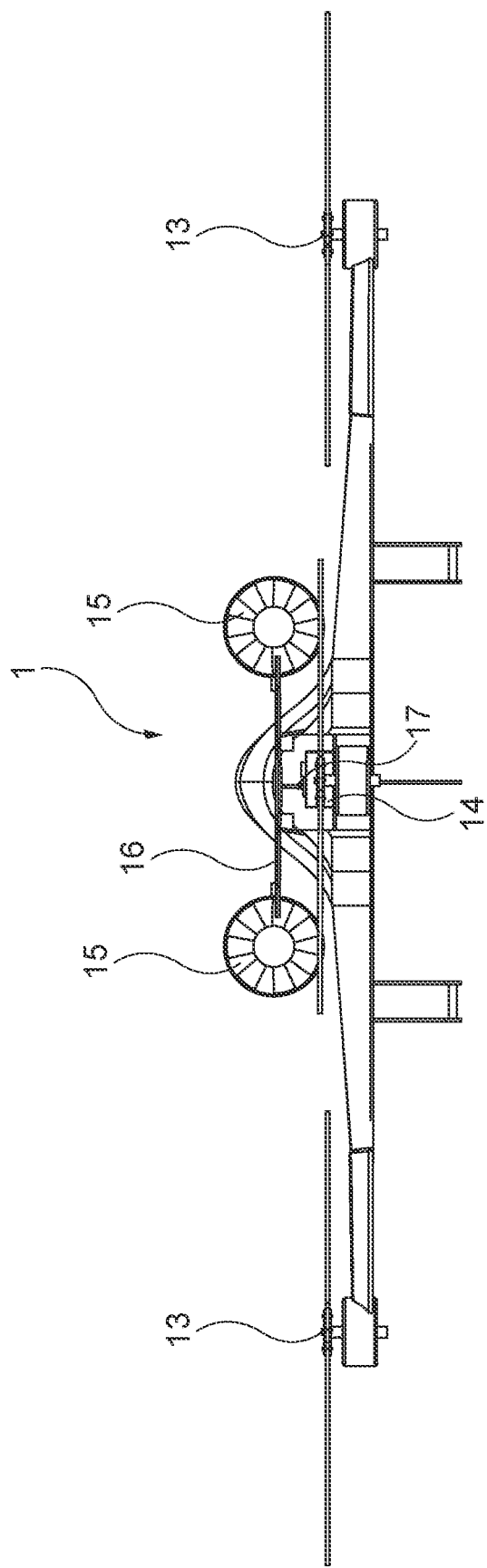
FIG. 2 is a rear view of a triaxial helicopter of the present invention.

With reference to FIGS. 1 and 2 for a triaxial helicopter of the present invention, the triaxial helicopter 1 comprises an airframe 11 and a fuselage 12, and three rotor modules 13 and a driving source 14 are installed to the airframe 11, and two turbofans 15 are mounted to the tail of the airframe 11, and a horizontal elevator 16 is installed between the two turbofans 15, and coupled to the driving source 14 through a link rod module 17. In an embodiment of the present invention, the driving source 14 is a servo motor.

Figure 3:
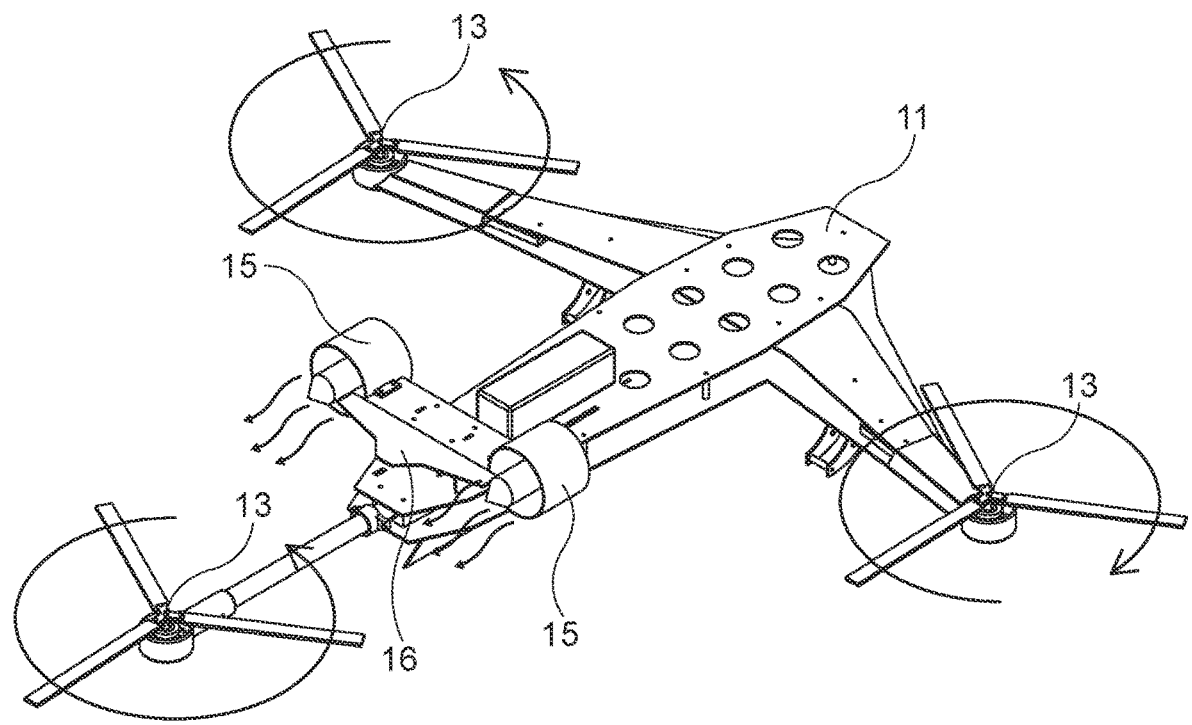
FIG. 3 is a schematic view of operating a triaxial helicopter of the present invention.

In FIG. 3, when the three rotor modules 13 of the triaxial helicopter 1 are rotated and operated to fly forward, the two turbofans 15 at the tail of the airframe 11 blows an airflow backward, so that the triaxial helicopter 1 is propelled to move forward by the backward airflow, without requiring an adjustment of the pitch angle of the airframe 11 or rotor module 13.

Figure 4:
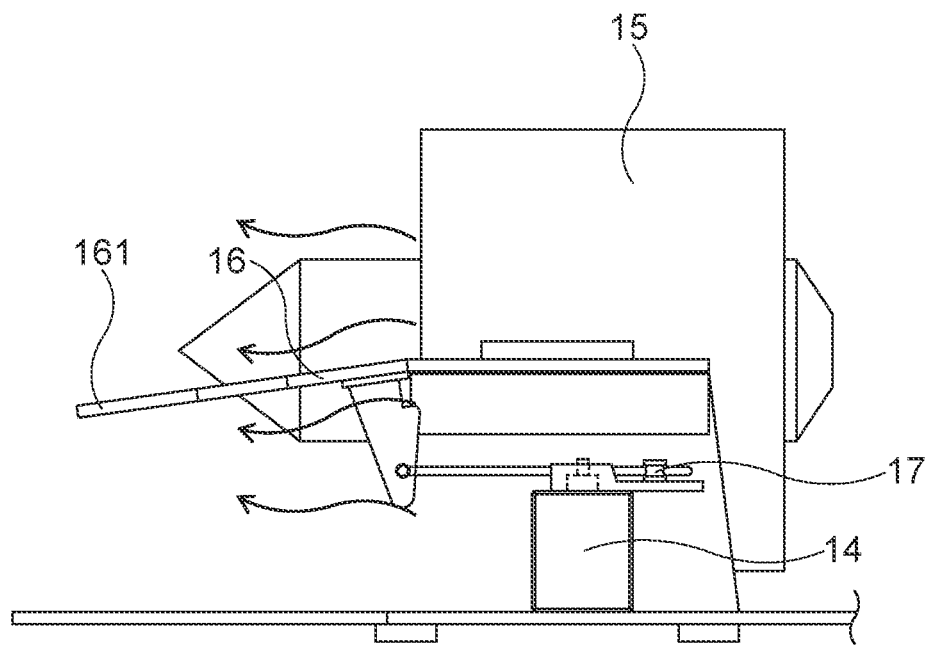
FIG. 4 is a schematic view of ascending a triaxial helicopter of the present invention.

In FIG. 4, when it is necessary to ascend the triaxial helicopter, the driving source 14 drives the link rod module 17 to prop the connecting the joint position of the horizontal elevator 16 and the link rod module 17 upward, so that the tail 161 of the horizontal elevator 16 forms an angle tilting downward. Since both ends of the horizontal elevator 16 fall within the operating range of the turbofan 15 and its fan blades, therefore the airflow produced by the operation of the two turbofans 15 blows downward in a direction towards the horizontal elevator 16, so as to adjust the direction of propelling the airflow and air and accelerate ascending the triaxial helicopter 1.

Figure 5:
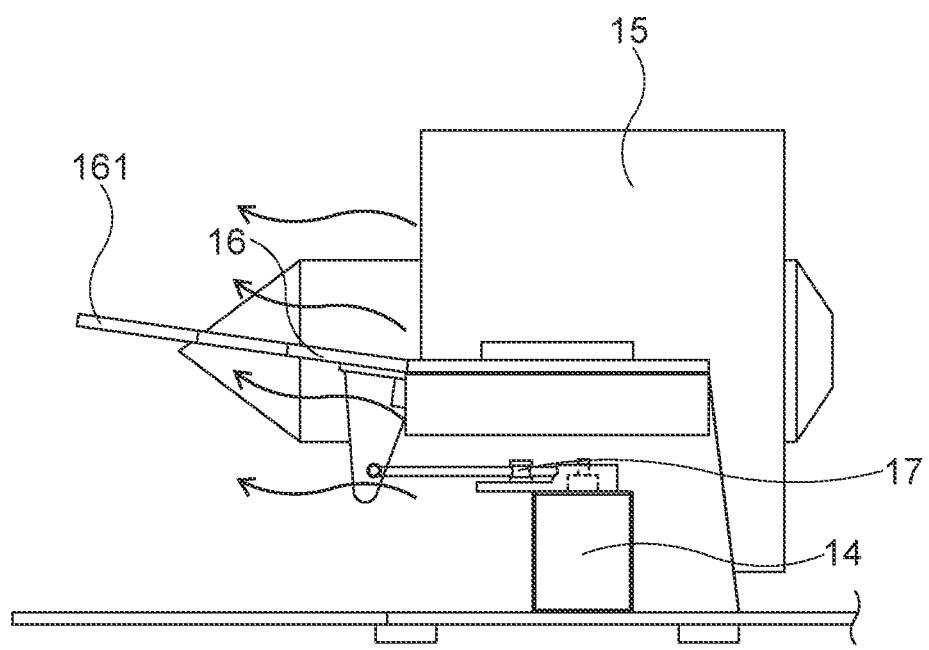
FIG. 5 is a schematic view of descending a triaxial helicopter of the present invention.

In FIG. 5, when it is necessary to descend the triaxial helicopter 1, the driving source 14 drives the link rod module 17 to pull the joint position of the horizontal elevator 16 and the link rod module 17 downward, so that the tail 161 of the horizontal elevator 16 forms an angle tilting upward. Now, the propelling airflow produced by the operation of the two turbofans 15 blows in an upward direction towards the horizontal elevator 16, so as to adjust the direction of propelling the airflow and air and accelerate descending the triaxial helicopter 1.

In summation, the triaxial helicopter of the present invention has the following effects:

In the triaxial helicopter of the present invention, the airflow produced by the operation of the two turbofans at the tail of the airframe propels the triaxial helicopter to move forward without requiring an adjustment of the pitch angle of the airframe or rotor module, so as to improve the flying speed of the triaxial helicopter and prevent the triaxial helicopter from losing its balance or even crashing due to the rapid forward movement.

In the triaxial helicopter of the present invention, the horizontal elevator is installed between the two turbofans of the triaxial helicopter, and both ends of the horizontal elevator fall within the airflow output range of the turbofan airflow, so that the airflow produced by the turbofans can blow in an upward or downward direction towards the horizontal elevator to increase the lifting force of the triaxial helicopter.

While the invention has been described by means of specific embodiments, numerous modifications and variations could be made thereto by those skilled in the art without departing from the scope and spirit of the invention set forth in the claims.

What is claimed is:

1. A triaxial helicopter, comprising
a fuselage and an airframe;
three rotor modules;
a driving source being installed to the airframe, characterized in that two turbofans are mounted at a tail of the airframe; and
a horizontal elevator installed between the two turbofans, wherein the horizontal elevator is coupled to the driving source through a link rod module, and the horizontal elevator is disposed within a range of the rotation of a fan blade of each of the turbofan, so that when the triaxial helicopter is operated, the two turbofans are operated to produce an airflow propulsion, and the driving source controls the link rod module to adjust the direction of the horizontal elevator according to an ascending or descending requirement, and the airflow blows in a direction with the horizontal elevator to increase the lifting force of the triaxial helicopter.

2. The triaxial helicopter of claim 1, wherein the driving source is a servo motor.

\* \* \* \* \*